(12) United States Patent
Hammer

(10) Patent No.: US 6,698,305 B1
(45) Date of Patent: Mar. 2, 2004

(54) LINEAR MODULE

(76) Inventor: Franz Hammer, Leo-Wolpertstrasse 2, D-63755 Alzenau (DE)

(*) Notice: Subject to any disclaimer, the term of this patent is extended or adjusted under 35 U.S.C. 154(b) by 0 days.

(21) Appl. No.: 09/530,228

(22) PCT Filed: Oct. 20, 1998

(86) PCT No.: PCT/DE98/03126
§ 371 (c)(1), (2), (4) Date: Jun. 16, 2000

(87) PCT Pub. No.: WO99/23388
PCT Pub. Date: May 14, 1999

(30) Foreign Application Priority Data

Oct. 30, 1997 (DE) ..................... 297 19 212 U
Jul. 1, 1998 (DE) ......................... 198 29 318

(51) Int. Cl.⁷ ................................. F16H 1/14
(52) U.S. Cl. .................. 74/424.71; 74/89.23
(58) Field of Search ................ 74/424.71, 424.72, 74/89.23, 490.1

(56) References Cited

U.S. PATENT DOCUMENTS

| 3,911,790 A | 10/1975 | Gaitten | |
| 6,142,030 A * | 11/2000 | Nagai et al. | 74/89.15 |
| 6,347,782 B1 * | 2/2002 | Gill | 251/58 |
| 2002/0020238 A1 * | 2/2002 | Takahashi et al. | 74/424.71 |

FOREIGN PATENT DOCUMENTS

| EP | 0472778 A | 3/1992 |
| EP | 0670427 A | 9/1995 |
| FR | 2535416 A | 5/1984 |
| FR | 2600384 A | 12/1987 |

* cited by examiner

Primary Examiner—David Fenstermacher
(74) Attorney, Agent, or Firm—Edwin D. Schindler

(57) ABSTRACT

A linear module having a housing with a holder being secured against rotation and having an element for axial adjustment relative to the housing. The holder is surrounded by a sleeve proximate the housing, with the sleeve being provided with an external thread and an internal thread with the same direction of rotation, but with a differing lead. A guiding tube, being a first tube, is shaped as a rectangular tube and is located within the housing. A second tube is located within the guiding tube and is also constructed as a rectangular tube, which is capable of coaxial movement within the guiding tube. A linear motor connected to the second tube with the linear motor exerting a force on the second tube which is coaxial to a common axis of the guiding tube and the second tube. The linear motor is rigidly connected at one end to the holder. Guiding rail include a bearing for guiding coaxial movement of the second tube within the first tube with the guiding rails allowing for adjusting the bearing spatially. A position measuring device is located in at least one of the guiding tube or the second tube for determining a relative coaxial position of the guiding tube as compared with the second tube and a control unit in communication with the position measuring device for indicating the relative coaxial position of the guiding tube relative the second tube.

22 Claims, 4 Drawing Sheets

LINEAR MODULE

BACKGROUND OF THE INVENTION

1. Technical Field of the Invention

The invention relates to a linear module comprising a guiding tube which is configured as a rectangular tube and a second tube. Said second tube is located in the guiding tube in such a way that it can move coaxially and is also configured as a rectangular tube. The inner rectangular tube is connected to a linear motor, which exerts forces on the inner tube, the action of said forces being coaxial to the common axis of the two tubes. The inner, moving tube is carried on the outer guiding tube. In order to adjust the bearing the guiding rails of the bearing are affixed so as to be adjustable spatially.

Linear modules are an indispensable tool for modern automatic handling technology, which is essential in the frame of an economic production and assembly automation.

2. Description of the Prior Art

Linear modules execute linear movements in the frame of this handling technology. In combinations they can be arranged at right angles to one another thereby also making non linear movements achievable at the end of the outer linear module.

Known linear modules are based on two or more guiding rods, arranged parallel to one another, and a linear motor likewise disposed parallel thereto in the general sense, as a rule with a pneumatic or electric drive.

To always guarantee, i.e. also in the two extreme outside positions, guiding at both ends, the two guiding rods must project more or less beyond both ends. This results in a bulky design. When loaded perpendicularly in relation to the planes formed by the two guiding rails, instabilities are quickly generated; therefore solely minor forces can be received. In the direction of the planes formed by the guiding rails, however, large forces can be received.

French Patent Nos. 2,535,416 and 2,600,384 are representative of the relevant prior art. French Patent No. 2,600,384 discloses a telescopic arm consisting of two telescoping elements. The elements have a rectangular cross section, and between the outer and inner element skids are attached to guide the inner element. The inner element is moved back and forth with a winch.

The disadvantages of the linear modules in the state of the art consist on the one hand therein that perpendicular to the plane formed by the two guiding rods large forces cannot be received, on the other therein that the linear motor—usually the cylinder—is not replaceable because the cylinder is integrated in the guiding body for the guiding rods. This is what the invention intends to remedy.

SUMMARY OF THE INVENTION

The invention, as characterised by the patent claims, solves the task of specifying a linear module which on the one hand is able to receive relatively high forces on all planes, on the other hand provides replaceability of the drive element.

In accordance with the invention, this task is solved therein that inside the moved tube or the guiding tube sensors (position measuring devices) are located via which the relative coaxial position of the tubes is reported to a control unit and/or can be queried from said control unit. The motor, especially the cylinder, is connected at one end rigidly to a holder, which is secured against rotation and adjustable axially and relatively to the housing. In the region of the housing, the holder is surrounded by a sleeve, which is provided with an external and an internal thread with the same direction of rotation but different lead and on the one hand works together with the holder and on the other hand with the housing.

The advantages achieved with the invention are essentially to be seen therein that the described linear module provided with hydraulic drive is suited to heavy loads, the drive can be effected by means of an integrated standard cylinder, the design is less bulky through limitation to a guiding tube and a moved tube and is suitable for hydraulic equipment up to 100 bar and larger strokes. To losses, a bearing arrangement between the inner moveable tube and the guiding tube is seen as advantageous. For the purpose of adjustment, it is then advantageous when the bearing arrangement can be set subsequently. To that end, the position of the guide rail which receives the roll bodies is changed spatially and adapted to the optimum condition. To make its possible to achieve any optional position, the use of sensors (position measuring devices) inside the moved tube or the guiding tube is proposed. The sensors permit the relative coaxial position of the two tubes in relation to each other to be recorded and displayed. The position measuring devices thus allow a defined adjustment—that is a stroke—of a defined length to be executed without several linear motors having to be, employed coaxially in tandem. Moreover, the shift path can be readily changed subsequently. Thus with the use of a single motor, by means of the installation of position measuring devices, predefined strokes can be created to attain any desired position.

To achieve an advantageous adjustment of the motor, or the cylinder, an arrangement is recommended whereby the motor or cylinder is connected at one end rigidly to a holder and this is adjustable in the housing axially and relatively thereto. A twist lock ensures that the cylinder does not execute a rotational movement. The holder can thereby can be actuated both directly as well as indirectly from outside. The objective of this measure for coaxial adjustment is to be able to effect an adjustment of the linear module in an axial direction, also after installation, and thus an adjustment to the concrete circumstances. In a suitable further development, in the region of the housing, the holder is surrounded by a sleeve which works together outwards with the housing and inwards with the holder. Decisive is that the sleeve is provided with an external and internal thread with the same direction of rotation but different lead. This arrangement allows a fine adjustment, that is a precise subsequent setting and adjustment.

The principal advantage of the invention, however, lies in the configuration of the inner moveable tube and the outer guiding tube as rectangular tubes, which makes it impossible for the tubes to twist in relation to each other. This allows an almost uniform loading capacity to be achieved in all planes.

Especially preferred is the use of a cylinder as a linear motor. The cylinder is to be disposed so that it works coaxially and generates relative movement between the inner coaxially moveable second tube and the guiding tube. Because of the coaxial alignment, on the one hand the cylinder is supported at the outer end of the coaxially arranged moveable second tube facing the guiding tube and on the other hand at the opposing end plate of the guiding tube. The drive of the cylinder is thereby to a large extent optional and can be effected hydraulically or pneumatically or electromechanically.

If the fastening means of the linear inner motor—which is usually a cylinder—is disposed coaxially displaceably and friction-lockably to the outer guiding tube or to the inside moveable tube, adjustment of the movement of the stroke is possible from outside.

Basically the option is given to fit the proposed holder to each of the two end faces of the motor or cylinder. The affixation to the outer end, that is toward the inner tube, is less advantageous for spatial reasons owing to the attachment of the tools. Instead it is proposed the attach the holder in the region of the spatially fixed guiding tube and thus to the outer end face so that the adjustment is effected from there.

By means of the described arrangement of several such linear motors in an embodiment in tandem, in particular cylinders, variable though predefined paths of movement can also be achieved. Through successive control of the single motors various positions can be achieved. Generally, every motor has only two defined positions, namely on the one hand the drawn in and on the other hand the fully drawn out condition. If several motors are connected in series coaxially and if the individual motors can be controlled singly, several positions can be attained in dependence on the combination of the respective motors. In the most general case, with N coaxially successively arranged motors, N+1 different planes can be achieved. These considerations apply to the same extent to the preferred case in which cylinders are used as linear motors. These embodiments apply to arrangements without position measuring devices. measuring devices) inside the moved tube or the guiding tube. They allow the relative coaxial position of the two tubes to each other to be recorded and displayed. The position measuring devices thus allow a defined adjustment—that is a stroke—of a defined length to be executed without several linear motors having to be employed coaxially in tandem. Moreover, the shift path can be readily changed subsequently. Thus with the use of a single motor, by means of the installation of position measuring devices, predefined strokes can be created to attain any desired position.

BRIEF DESCRIPTION OF THE DRAWING FIGURES

In the following, the invention is explained in greater detail using drawings representing solely one typical embodiment. It shows limited to a diagrammatic representation:

FIG. 1 an inventive linear module in longitudinal representation

FIG. 2 a linear module in cross section

FIG. 3 an embodiment with several linear motors

FIG. 4 position measuring devices disposed inside the outer guiding tube

DETAILED DESCRIPTION OF THE DRAWING AND PREFERRED EMBODIMENTS

Figure 1:
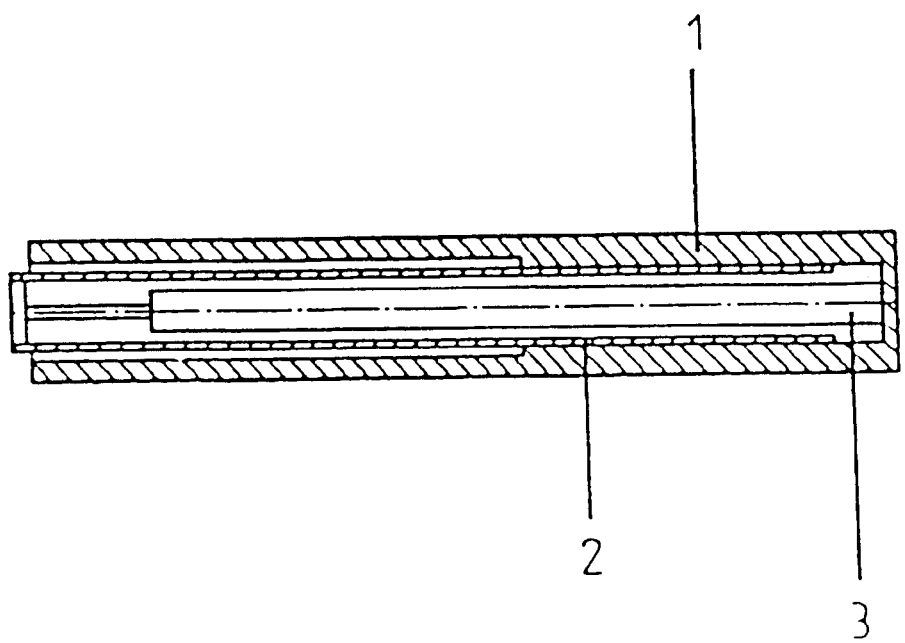
FIG. 1 shows in a longitudinal representation an inventive linear module with outer guiding tube (1), which is configured as a rectangular tube, with inner moveable tube (2), which is also configured as a rectangular tube, and the linear motor (3) disposed inside the two tubes, which facilitates the coaxial movement of the inner moveable tube (2) in relationship with the outer guiding tube (1).
Figure 2:
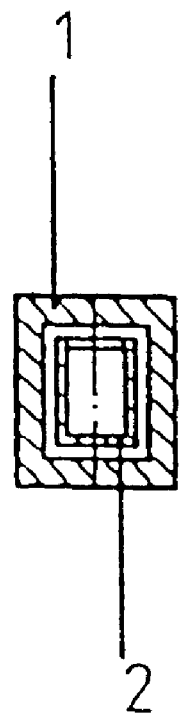
FIG. 2 shows an inventive linear module in a cross section with an outer guiding tube (1), which is configured as a rectangular tube, and, disposed coaxially thereto, an inner moveable tube (2), which is also configured as a rectangular tube.
Figure 3:
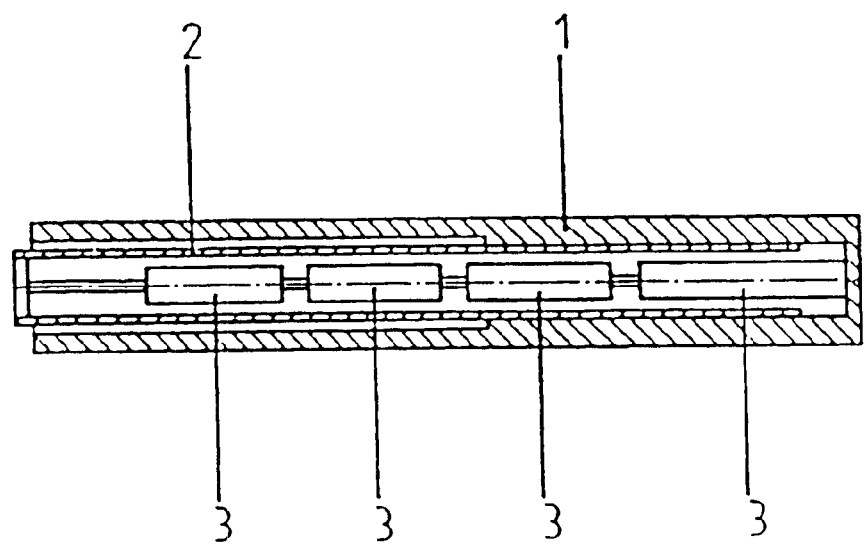

FIG. 3 also shows an inventive embodiment in which several linear motors—here hydraulic cylinders (3)—are disposed in tandem and by means of simultaneous or successive pressurisation of one part or all hydraulic cylinders (3) a predefined path of movement can be achieved, which can also be effected flexibly by means of the control.

Figure 4:
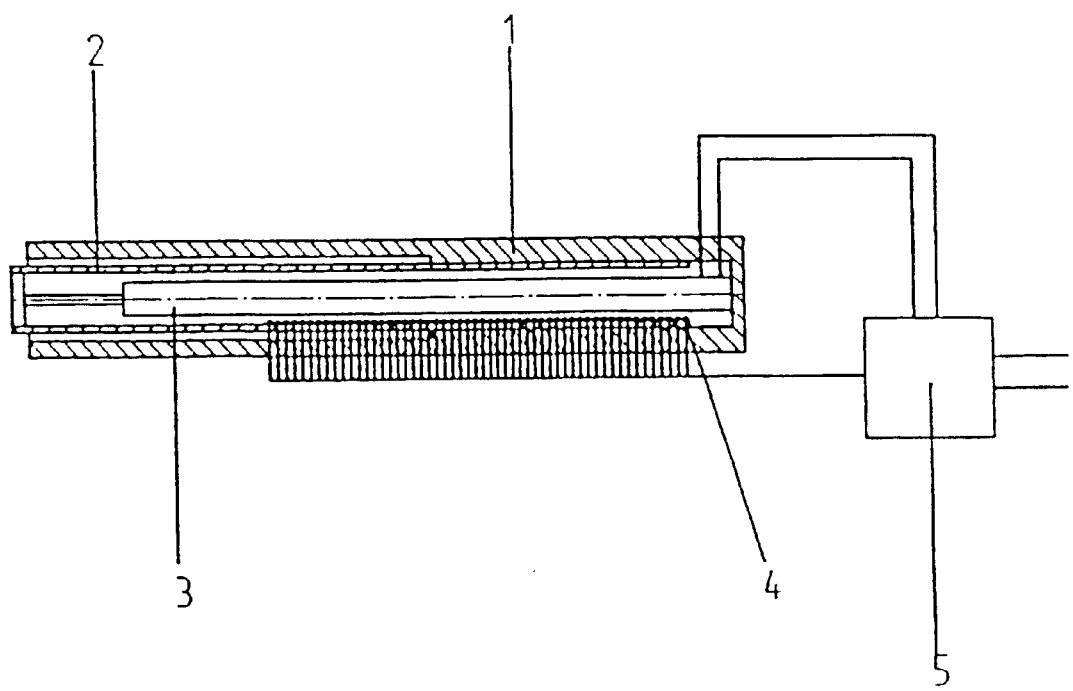

FIG. 4 on the other hand shows a further inventive embodiment in which inside the outer guiding tube (1) position measuring devices (4) are disposed which forward corresponding information about the relative position of guiding tube (1) and inner moved tube (2) to a control unit (5), which in turn controls the pressurisation of linear motor (3), which is realised here as a hydraulic cylinder, with hydraulic pressure by means of which predefined or controllable paths of movement—i.e. strokes—are made possible.

What is claimed is:

1. A linear module, comprising:

a housing;

a holder being secured against rotation and having means for axial adjustment relative to said housing, said holder being surrounded by a sleeve proximate said housing, said sleeve being provided with an external thread and an internal thread with the same direction of rotation, but with a differing lead;

a guiding tube, being a first tube, and shaped as a rectangular tube and located within said housing;

a second tube located within said guiding tube, said second tube being constructed as a rectangular tube and being capable of coaxial movement within said guiding tube;

a linear motor connected to said second tube, said linear motor exerting a force on said second tube which is coaxial to a common axis of said guiding tube and said second tube, said linear motor being rigidly connected at one end to said holder; and guiding rails having a bearing for guiding coaxial movement of said second tube within said first tube.

2. The linear module according to claim 1, wherein said linear motor is cylindrical.

3. The linear module according to claim 2, further comprising fastening plates with said linear motor being connected to said fastening plates at an outer end of said second tube.

4. The linear module according to claim 2, wherein said linear motor is connected with said second tube so that said linear motor is displaceable coaxially to the movement of direction of said second tube and is friction-lockable to either said guiding tube or said second tube.

5. The linear module according to claim 2, wherein said linear motor is connected with said guiding tube so that said linear motor is displaceable coaxially to the movement of direction of said second tube and is friction-lockable to either said guiding tube or said second tube.

6. The linear module according to claim 1, wherein said linear motor is a first linear motor and further including at least one additional linear motor, said first linear motor and said at least one additional linear motor being independently controllable and arranged coaxially and in tan-dem inside both of said guiding tube and said second tube.

7. The linear module according to claim 1, wherein said linear motor is connected to said guiding tube and is arranged coaxially with means for said linear motor to be displaceable and lockable relative to said guiding tube.

8. The linear module according to claim 1, wherein said linear motor is moveable relative to said second tube and with arranged coaxially therewith, with means for said linear motor to be displaceable and lockable relative to said second tube.

9. The linear module according to claim 1, wherein said holder is guide along an end face of said guiding tube through said housing.

10. The linear module according to claim 1, wherein said guiding rails include means for adjusting said bearing spatially.

11. The linear module according to claim 1, wherein said guiding tube and said second tube are electrically connected via an electric coiled cord comprising a plurality of wires orientated in parallel to said guiding tube.

12. The linear module according to claim 1, further comprising two stops for limiting movement of said second tube, said two stops being infinitely variable.

13. The linear module according to claim 12, wherein said two stops are hydraulically cushioned.

14. A linear module, comprising:

a housing;

a holder being secured against rotation and having means for axial adjustment relative to said housing, said holder being surrounded by a sleeve proximate said housing, said sleeve being provided with an external thread and an internal thread with the same direction of rotation, but with a differing lead:

a guiding tube, being a first tube, and shaped as a rectangular tube and located within said housing;

a second tube located within said guiding tube, said second tube being constructed as a rectangular tube and being capable of coaxial movement within said guiding tube;

a linear motor connected to said second tube, said linear motor exerting a force on said second tube which is coaxial to a common axis of said guiding tube and said second tube, said linear motor being rigidly connected at one end to said holder;

guiding rails having a bearing for guiding coaxial movement of said second tube within said first tube, said guiding rails including means for adjusting said bearing spatially;

position measuring means being located in at least one of said guiding tube or said second tube for determining a relative coaxial position of said guiding tube as compared with said second tube; and, a control unit in communication with said position measuring means for indicating the relative coaxial position of said guiding tube relative said second tube.

15. The linear module according to claim 14, wherein said linear motor is cylindrical.

16. The linear module according to claim 15, further comprising fastening plates with said linear motor being connected to said fastening plates at an outer end of said second tube.

17. The linear module according to claim 15, wherein said linear motor is connected with said second tube so that said linear motor is displaceable coaxially to the movement of direction of said second tube and is friction-lockable to either said guiding tube or said second tube.

18. The linear module according to claim 15, wherein said linear motor is connected with said guiding tube so that said linear motor is displaceable coaxially to the movement of direction of said second tube and is friction-lockable to either said guiding tube or said second tube.

19. The linear module according to claim 14, wherein said linear motor is a first linear motor and further including at least one additional linear motor, said first linear motor and said at least one additional linear motor being independently controllable and arranged coaxially and in tandem inside both of said guiding tube and said second tube.

20. The linear module according to a claim 14, wherein said linear motor is connected to said guiding tube and is arranged coaxially with means for said linear motor to be displaceable and lockable relative to said guiding tube.

21. The linear module according to claim 14, wherein said linear motor is moveable relative to said second tube and with arranged coaxially therewith, with means for said linear motor to be displaceable and lockable relative to said second tube.

22. The linear module according to claim 14, wherein said holder is guided along an end face of said guiding tube through said housing.

* * * * *